United States Patent
Seo et al.

(10) Patent No.: US 11,117,120 B2
(45) Date of Patent: Sep. 14, 2021

(54) CATALYST FOR SYNTHESIZING CARBON NANOTUBE AND METHOD OF SYNTHESIZING CARBON NANOTUBE

(71) Applicants: SK Innovation Co., Ltd., Seoul (KR); SK Global Chemical Co., Ltd., Seoul (KR)

(72) Inventors: Hye Ryun Seo, Daejeon (KR); Yong Tak Kwon, Daejeon (KR)

(73) Assignees: SK Innovation Co., Ltd., Seoul (KR); SK Global Chemical Co., Ltd., Seoul (KR)

( * ) Notice: Subject to any disclaimer, the term of this patent is extended or adjusted under 35 U.S.C. 154(b) by 54 days.

(21) Appl. No.: 16/174,456

(22) Filed: Oct. 30, 2018

(65) Prior Publication Data
US 2019/0126255 A1    May 2, 2019

(30) Foreign Application Priority Data
Oct. 31, 2017   (KR) ........................ 10-2017-0143615

(51) Int. Cl.
| | |
|---|---|
| B01J 23/889 | (2006.01) |
| B01J 21/02 | (2006.01) |
| B01J 37/02 | (2006.01) |
| B01J 37/08 | (2006.01) |
| B01J 37/04 | (2006.01) |
| C01B 32/162 | (2017.01) |

(52) U.S. Cl.
CPC ........... *B01J 23/8892* (2013.01); *B01J 21/02* (2013.01); *B01J 37/0201* (2013.01); *B01J 37/04* (2013.01); *B01J 37/08* (2013.01); *C01B 32/162* (2017.08); *B01J 2523/31* (2013.01); *B01J 2523/72* (2013.01); *B01J 2523/845* (2013.01)

(58) Field of Classification Search
CPC ... B01J 21/04; B01J 21/08; B01J 21/10; B01J 21/12; B01J 21/185; B01J 23/75; B01J 23/8892; C01B 32/15
See application file for complete search history.

(56) References Cited

U.S. PATENT DOCUMENTS

| | | |
|---|---|---|
| 8,398,894 B2 | 3/2013 | Choi et al. |
| 9,108,851 B2 | 8/2015 | Kim et al. |

(Continued)

FOREIGN PATENT DOCUMENTS

| | | |
|---|---|---|
| EP | 2835177 A1 | 2/2015 |
| KR | 1020050108665 A | 11/2005 |

(Continued)

OTHER PUBLICATIONS

Becker et al., Optimizing the synthesis of cobalt-based catalysts for the selective growth of multiwalled carbon nanotubes under industrially relevant conditions, Carbon 40 (2011) p. 5253-5264.*

*Primary Examiner* — Jun Li
(74) *Attorney, Agent, or Firm* — The Webb Law Firm

(57) ABSTRACT

A catalyst for synthesizing a carbon nanotube includes a support containing a metal, and an active metal impregnated on the support. The active metal includes cobalt and manganese. A surface molar ratio of the active metal relative to the metal of the support is 40% or less of a bulk molar ratio of the active metal relative to the metal of the support. A carbon nanotube having high purity and low resistance is obtained from the catalyst.

12 Claims, 1 Drawing Sheet

(56) References Cited

U.S. PATENT DOCUMENTS

| | | |
|---|---|---|
| 9,409,779 B2 | 8/2016 | Buchholz et al. |
| 2009/0087372 A1 | 4/2009 | Buchholz et al. |
| 2010/0276644 A1* | 11/2010 | Wolf .................... C01B 32/162 |
| | | 252/512 |
| 2013/0171054 A1* | 7/2013 | Kim ...................... B01J 35/026 |
| | | 423/447.2 |
| 2015/0093576 A1 | 4/2015 | Bae et al. |
| 2016/0129424 A1* | 5/2016 | Pant ........................ B01J 37/18 |
| | | 423/415.1 |

FOREIGN PATENT DOCUMENTS

| | | |
|---|---|---|
| KR | 100739943 B1 | 7/2007 |
| KR | 1020070084180 A | 8/2007 |
| KR | 101089570 B1 | 12/2011 |
| KR | 101350690 B1 | 1/2014 |
| KR | 1020150039072 A | 4/2015 |

\* cited by examiner

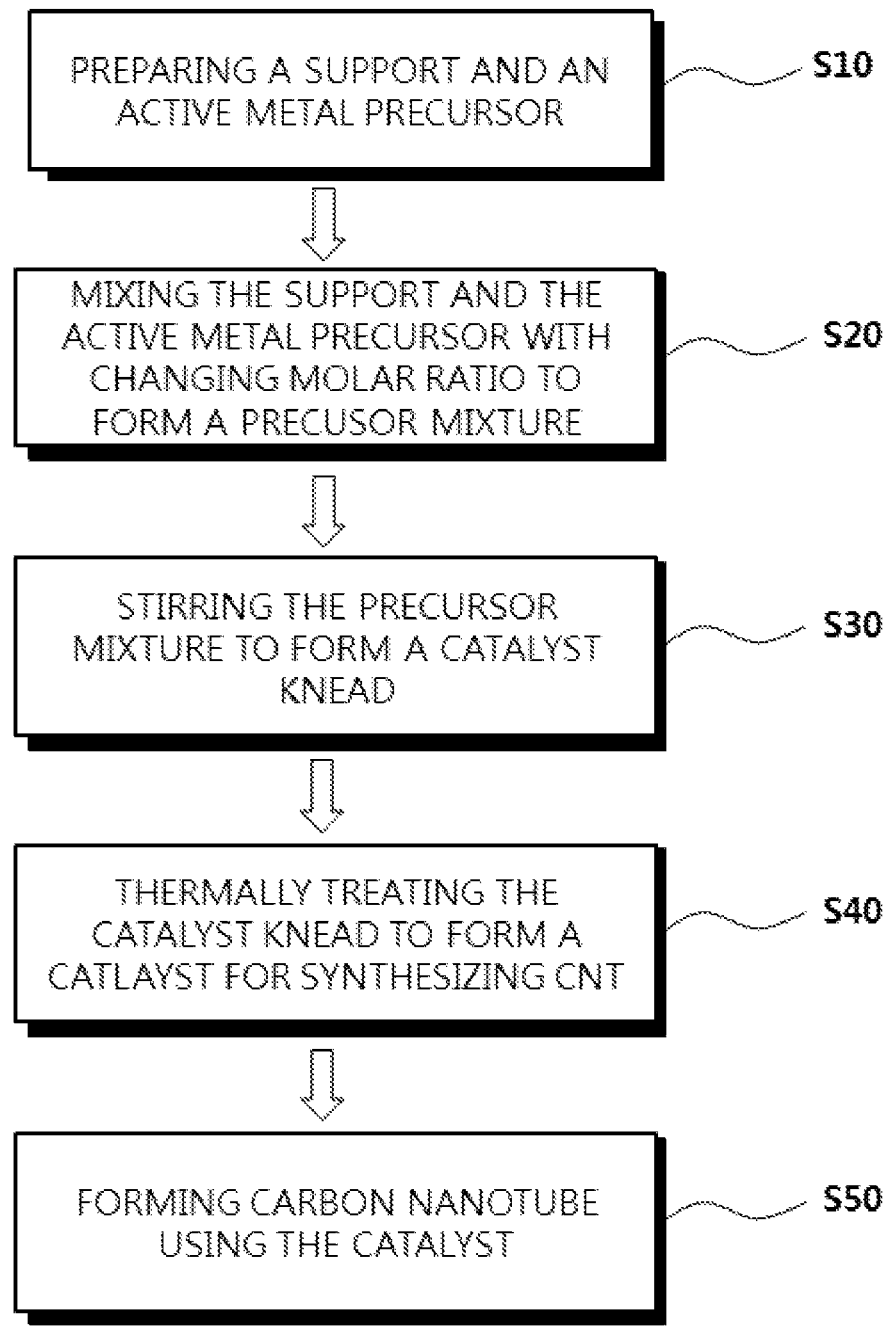

CATALYST FOR SYNTHESIZING CARBON NANOTUBE AND METHOD OF SYNTHESIZING CARBON NANOTUBE

CROSS-REFERENCE TO RELATED APPLICATION

This application claims priority to Korean Patent Applications No. 10-2017-0143615 filed Oct. 31, 2017, the disclosure of which is hereby incorporated in its entirety by reference.

BACKGROUND

1. Field

The present invention relates to a catalyst for synthesizing carbon nanotube and a method of synthesizing carbon nanotube. More particularly, the present invention relates to a catalyst for synthesizing carbon nanotube including a support and an active metal and a method of synthesizing carbon nanotube utilizing the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as a power source of an eco-friendly vehicle such as a hybrid automobile.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (or a separator), and an electrolyte immersing the electrode assembly. The lithium secondary battery may further include an outer case having, e.g., a pouch shape for accommodating the electrode assembly and the electrolyte.

For example, a carbon-based conductive material may be utilized as an anode active material or a conductive agent of the cathode in the lithium secondary battery. Examples of the carbon-based conductive material include graphite, carbon black, graphene, carbon nanotube, or the like. Among the above materials, carbon nanotube has an enhanced low-resistance property to be effectively used as, e.g., the conductive agent.

When carbon nanotube is used as the conductive agent of the lithium secondary battery as described above, impurities of various transition metals included in carbon nanotube may degrade operational properties of the cathode or the lithium secondary battery. Thus, carbon nanotube having a high purity with reduced impurities is needed for being more properly used as the conductive agent.

For example, Korean Published Patent Application No. 10-2005-0108665 discloses a method of producing carbon nanotube from a chemical vapor deposition (CVD) process. Korean Registered Patent No. 10-0739943 disclosed a lithium secondary battery using carbon nanotube as a conductive agent.

SUMMARY

According to an aspect of the present invention, there is provided a catalyst for synthesizing carbon nanotube having improved purity and electrical properties.

According to an aspect of the present invention, there is provided a method of synthesizing carbon nanotube using the catalyst.

According to exemplary embodiments, a catalyst for synthesizing carbon nanotube includes a support containing a metal, and an active metal impregnated on the support, the active metal including cobalt and manganese. A surface molar ratio of the active metal relative to the metal of the support is 40% or less of a bulk molar ratio of the active metal relative to the metal of the support.

According to example embodiments, a support containing a metal, a cobalt precursor and a manganese precursor are prepared. The support, the cobalt precursor and the manganese precursor are mixed so that molar ratios are changed to form a catalyst knead. A thermal treatment is performed on the catalyst knead to form a catalyst for synthesizing carbon nanotube. A carbon nanotube is formed using the catalyst.

According to exemplary embodiments as described above, the catalyst for synthesizing carbon nanotube may include a support and an active metal containing cobalt and manganese impregnated thereon. The support may include aluminum oxide (e.g., alumina), and the catalyst may have predetermined surface molar ratio and bulk ratio of cobalt and manganese relative to aluminum.

In the molar ratio ranges, carbon nanotube having high purity and reduced amount of impurities may be achieved. A low resistance property of carbon nanotube may be also enhanced.

In some embodiments, the active metal may consist essentially of cobalt and manganese, and may not include other transition metals such as iron, nickel, etc. Thus, when carbon nanotube is employed in a conductive agent of a lithium secondary battery, deterioration of a battery operation by the other transition metals may be avoided.

BRIEF DESCRIPTION OF THE DRAWING

FIG. 1 is a flow chart illustrating a method of synthesizing carbon nanotube in accordance with exemplary embodiments.

DETAILED DESCRIPTION OF THE EMBODIMENTS

According to exemplary embodiments of the present invention, there is provided a catalyst for synthesizing carbon nanotube including a support, and cobalt and manganese which are impregnated on the support and satisfy desired ranges of a surface molar ratio and a bulk molar ratio. A method of synthesizing carbon nanotube having high purity and low resistance is also provided. According to exemplary embodiments, a lithium secondary battery including carbon nanotube and having improved capacity and power output is provided, and a method of fabricating the lithium secondary battery is also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

A catalyst for synthesizing carbon nanotube (hereinafter, abbreviated to a CNT synthesis catalyst) may include a support and an active metal impregnated or supported thereon.

In exemplary embodiments, an aluminum-based support may be used as the support. For example, the aluminum-based support may include $Al_2O_3$ (alumina), AlO(OH) or $Al(OH)_3$, etc.

Preferably, alumina may be used as the aluminum-based support. Alumina may have a relatively high adsorption capability so that an impregnation of the active metal may be effectively implemented. Further, a generation of impurities in carbon nanotube may be reduced so that high purity and productivity process may be efficiently realized.

In exemplary embodiments, the active metal may include cobalt (Co) and manganese (Mn), and cobalt and manganese may each satisfy specific surface molar ratio and bulk molar ratio relative to aluminum of the aluminum-based support.

The surface molar ratio may indicate an average molar ratio between ingredients measured at a surface of the catalyst (e.g., within a thickness of 10 nm from an outermost surface of the catalyst). The bulk molar ratio may indicate an average molar ratio between ingredients throughout an entire region of a catalyst particle.

The CNT synthesis catalyst may be formed as, e.g., a powder or an aggregation of individual particles. The surface molar ratio may indicate a concentration ratio (e.g., a concentration ratio relative to aluminum) at a surface of the CNT synthesis catalyst particle.

In exemplary embodiments, a surface molar ratio of the active metal including cobalt and manganese in the CNT synthesis catalyst may be about 40% or less of a bulk molar ratio. If the surface molar ratio of the active metal exceeds about 40% of the bulk molar ratio, an amount of the active metal exposed at the surface of the catalyst particle may be increased, metal particles may be assembled in a high temperature synthesis process to have an excessive size, and a catalyst activity may be degraded. Further, a purity of obtained carbon nanotube may become less than about 90%.

Preferably, the surface molar ratio may be controlled in a range from about 10% to about 30% of the bulk molar ratio from an aspect of a purity of carbon nanotube and an activity at the catalyst surface.

In some embodiments, the surface molar ratio of the active metal may be in a range from about 0.03 to about 0.06 relative to aluminum of the support. The bulk molar ratio of the active metal may be in range from about 0.15 to about 0.29 relative to aluminum of the support.

In an embodiment, the surface molar ratio may be represented by Equation 1.

$$\text{aluminum (Al):cobalt (Co):manganese (Mn)}=1:x1:y1 \quad \text{[Equation 1]}$$

$(0.02 \leq x1 \leq 0.04, 0.01 \leq y1 \leq 0.02)$

In the Equation 1, the surface molar ratio of the active metal including cobalt and manganese relative to aluminum may be represented by $0.03 \leq x1+y1 \leq 0.06$ as described above.

If the surface molar ratio of cobalt and manganese relative to aluminum is less than about 0.03, carbon nanotube may not be substantially synthesized. If the surface molar ratio of cobalt and manganese relative to aluminum exceeds about 0.06, a dimension of an active site from the active metal may be increased to deteriorate the purity of carbon nanotube.

In some embodiments, preferably, $0.0200 \leq x1 \leq 0.0375$, $0.0130 \leq y1 \leq 0.0189$ and $0.0330 \leq x1+y1 \leq 0.0564$. Within this range, purity and low-resistance property of synthesized carbon nanotube may be further enhanced.

The bulk molar ratio may be represented by Equation 2.

$$\text{aluminum (Al):cobalt (Co):manganese (Mn)}=1:x2:y2 \quad \text{[Equation 2]}$$

$(0.08 \leq x2 \leq 0.15, 0.07 \leq y2 \leq 0.14)$

In the Equation 2, the bulk molar ratio of the active metal including cobalt and manganese relative to aluminum may be represented by $0.15 \leq x2+y2 \leq 0.29$ as described above.

If the bulk molar ratios of cobalt and manganese relative to aluminum are less than about 0.08 and 0.07, respectively, active sites of the catalyst may not be sufficient. Thus, carbon nanotube with high purity may not be achieved or mechanical defects may be caused in a synthesized carbon nanotube.

If the bulk molar ratios of cobalt and manganese relative to aluminum exceed about 0.15 and 0.14, respectively, a dimension of the active site from the active metal may be increased to deteriorate the purity of carbon nanotube and process productivity may be reduced due to an increase of a catalyst production cost.

As described above, the surface molar ratio of the active metal in the CNT synthesis catalyst may be smaller than the bulk molar ratio, and may be about 40% or less of the bulk molar ratio. In some embodiments, each surface molar ratio of cobalt and manganese in the active metal may be less than each bulk molar ratio.

Thus, activity and stability of the catalyst may be maintained through the relatively high bulk molar ratio, and reduction of purity and increase of resistance due to impurities in carbon nanotube may be prevented through the relatively low surface molar ratio during the synthesis of carbon nanotube. Therefore, carbon nanotube having improved electrical properties may be obtained from the CNT synthesis catalyst while maintaining high mechanical stability and productivity.

In some embodiments, the active metal may consist essentially of cobalt and manganese. For example, the CNT synthesis catalyst may not include other transition metals (such as iron (Fe), nickel (Ni), molybdenum (Mo), etc.) except for cobalt and manganese.

Accordingly, when carbon nanotube synthesized from the CNT synthesis catalyst is used as a conductive agent of a cathode in a lithium secondary battery, power reduction, operational disturbance of the cathode, etc., caused by the other transition metals may be avoided. Further, a purity of carbon nanotube may be improved to lower a resistance of carbon nanotube.

FIG. 1 is a flow chart illustrating a method of synthesizing carbon nanotube in accordance with exemplary embodiments.

Referring to FIG. 1, a support and an active metal precursor may each be prepared (e.g., in a phase of S10).

In some embodiments, an aluminum support such as aluminum oxide (e.g., $Al_2O_3$) may be used.

The active metal precursor may include a cobalt precursor and a manganese precursor. In some embodiments, the active metal precursor may consist essentially of the cobalt precursor and the manganese precursor, and may not include other transition metal precursors.

The cobalt precursor may include, e.g., cobalt nitrate or hydrate thereof, cobalt oxide, cobalt hydroxide, cobalt hydrate, etc. The manganese precursor may include, e.g., manganese nitrate or hydrate thereof, manganese oxide, manganese hydroxide, manganese hydrate, etc. These may be used alone or in a combination thereof.

In some embodiments, cobalt nitrate (e.g., $Co(NO_3)_2$) or hydrate thereof may be used as the cobalt precursor, and manganese nitrate (e.g., $Mn(NO_3)_2$) or hydrate thereof may be used as the manganese precursor.

In this case, nitrate groups combined with cobalt and manganese may be easily removed or separated by a subsequent process so that only active metals may be transferred from the active metal precursors to a CNT synthesis catalyst.

The support and the active metal precursors may be mixed (e.g., in a phase of S20).

In exemplary embodiments, the support, the cobalt precursor and the manganese precursor may be mixed with water to from a precursor mixture.

In the formation of the precursor mixture, a content ratio (e.g., a molar ratio) of the active metal precursor relative to the metal of the support (e.g., aluminum) may be changed during the mixing process. In some embodiments, a final mixing ratio of the active metal precursors may be controlled to be lower than an initial mixing ratio of the active metal precursors. In an embodiment, the active metal precursors may be provided so that a mixing ratio of the active metal precursors may be gradually decreased.

The precursor mixture may be prepared in a formulation of a knead or a dough and not in a formulation of an aqueous solution so that a preliminary catalyst knead may be obtained.

Subsequently, the precursor mixture may be stirred to from a catalyst knead (e.g., in a phase of S30). For example, the preliminary catalyst knead may be stirred to form the catalyst knead having a substantially single phase.

As described above, the precursor mixture may be prepared as the knead formulation (not as the aqueous solution) so that the surface molar ratio and the bulk molar ratio of the active metal may be easily fixed. Further, the active metal may be easily impregnated on the support by a thermal treatment process as described below.

The thermal treatment may be performed on the catalyst knead to from a CNT synthesis catalyst (e.g., in a phase of S40).

The thermal treatment may include a drying process and/or a calcination process (or a firing process). In an embodiment, the drying process and the calcination process may be sequentially performed. For example, the drying process may be performed at a temperature in a range from about 100° C. to 150° C., and the calcination process may be performed at a temperature in a range from about 400° C. to about 600° C.

The active metal may be crystallized on the aluminum-based support by the thermal treatment so that the surface molar ratio and the bulk molar ratio of cobalt and manganese in the active metal may be fixed to form the CNT synthesis catalyst.

In exemplary embodiments, the surface molar ratio of cobalt and manganese may be about 40% of the bulk molar ratio or less. For example, the surface molar ratio and the bulk molar ratio of cobalt and manganese may be fixed within a range represented by the above Equations 1 and 2.

Carbon nanotube may be synthesized using the CNT synthesis catalyst prepared as described above (e.g., in a phase of S50). In exemplary embodiments, carbon nanotube may be obtained by a chemical vapor synthesis or a chemical vapor deposition.

For example, the CNT synthesis catalyst may be loaded in a reactor, and then a carbon source may be injected into the reactor to induce a synthesis of carbon nanotube. The carbon source may include, e.g., methane, ethylene, acetylene, etc.

In an embodiment, a hydrogen gas may be injected together with the carbon source. A generation of amorphous carbon may be prevented by the hydrogen gas during the synthesis of carbon nanotube.

The synthesized carbon nanotube may include a single-wall carbon nanotube (SWCNT), a double-wall carbon nanotube (DWCNT) or a multi-wall carbon nanotube (MWCNT). In an embodiment, the MWCNT may be achieved from the process using the CNT synthesis catalyst.

As described above, carbon nanotube having high purity and low resistance may be synthesized using the CNT synthesis catalyst in which the surface molar ratio and the bulk molar ratio of the active metal may be fixed to be different from each other. Further, other transition metals such as iron, nickel, molybdenum, etc., may be blocked from being mixed during the process so that the synthesized carbon nanotube may be directly used as a conductive agent of a battery without an additional post-treatment.

In exemplary embodiments, a purity (a carbon purity) of the obtained carbon nanotube may be about 90% or more. The carbon nanotube may be substantially devoid of impurities containing iron, nickel and molybdenum.

A construction of a lithium secondary battery to which carbon nanotube is applied or a method of applying carbon nanotube as the conductive agent of the lithium secondary battery may not be specifically limited. For example, Korean Registered Patent No. 10-0739943 (2007.07.09.) which is incorporated by reference herein discloses an exemplary method applying carbon nanotube to the lithium secondary battery.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Experimental Example 1: Evaluation on Purity and Yield of Carbon Nanotube

Preparation of CNT Synthesis Catalyst

Predetermined amounts of $Co(NO_3)_2 \cdot 6H_2O$ as a cobalt precursor and $Mn(NO_3)_2 \cdot 6H_2O$ as a manganese precursor were mixed with water and stirred to form an active metal precursor mixture. The active metal precursor mixture was gradually introduced in a beaker together with 10 g (0.098 mol) of $Al_2O_3$ to form a catalyst precursor mixture. The catalyst precursor mixture was kneaded and aged. The catalyst knead was dried at 120° C. for 3 hours, and calcinated at 500° C. for 3 hours to form a CNT synthesis catalyst.

Amounts of the cobalt precursor and the manganese precursor were changed so that the surface molar ratio was different from the bulk molar ratio to form the CNT synthesis catalysts of Examples and Comparative Examples as shown in Table 1 below.

The surface molar ratio of the catalyst was measured by analyzing an atomic composition within a thickness range of 0.002-0.01 μm using an X-ray Photoelectron Spectroscopy (XPS) device. An X-ray source was Al—K alpha, 1486.68 eV, 650 μm Beam, and the analysis was performed after removing surface contaminants for 3 minutes using a cluster gun.

Surface amounts (At. %) of cobalt, manganese, aluminum and oxygen were measured, and then molar ratios of cobalt and manganese relative to aluminum were each calculated to obtain final surface molar ratios (x1, y1).

The bulk molar ratio of the catalyst was measured using an Energy Dispersive X-ray Fluorescence (ED-XRF, Epsilon-3XL) device. Specifically, an X-ray flux (34% Lithium metaborate, 66% Lithium tetraborate) and a catalyst sample were mixed by a ratio of 5:1 (w/w) for a pre-treatment, and melt at 1,100° C. to form a solution. The solution including the sample dissolved therein was poured to a plate to obtain a pre-treated sample in a bead shape. 15 W Ag—K alpha was used as an X-ray source for a bulk composition by a semi-quantitative analysis. The bulk amounts of cobalt, manganese and aluminum oxide (wt %) were measured, and then the bulk amounts were converted into each molar ratio of cobalt and manganese relative to aluminum to achieve finale bulk molar ratios (x2, y2).

Fabrication of Carbon Nanotube 0.2 g of the CNT synthesis catalysts prepared in Examples and Comparative Examples were loaded in the middle of a quartz tube, and heated to 700° C. in a nitrogen atmosphere. Subsequently, an ethylene gas wad provided together with a hydrogen gas at a flow rate of 0.3 L/min for 20 minutes to form carbon nanotube.

A purity of the synthesized carbon nanotube was measured using a thermo gravimetric analysis (TGA) device (TA instrument Q-5000). Specifically, a weight change of carbon nanotube was measured while increasing a temperature to 900° C., and a carbon purity of carbon nanotube was measured through a remaining weight analysis. A carbon nanotube yield was calculated as a generation weight of carbon nanotube (g CNT) relative to 1 g of the catalyst (g Cat).

The results are shown in Table 1 below.

TABLE 1

|  | Example 1 | Example 2 | Comparative Example 1 |
|---|---|---|---|
| Surface Molar Ratio (x1 + y1) | 0.0426 (x1: 0.0239) (y1: 0.0186) | 0.0499 (x1: 0.0349) (y1: 0.0150) | 0.0569 (x1: 0.0379) (y1: 0.0190) |
| Bulk Molar Ratio (x2 + y2) | 0.23 (x2: 0.12) (y2: 0.11) | 0.19 (x2: 0.10) (y2: 0.09) | 0.12 (x2: 0.06) (y2: 0.06) |
| Surface Molar Ratio/Bulk Molar Ratio (%) ((x1 + y1)/(x2 + y2) × 100) | 18.52 | 26.26 | 47.42 |
| CNT Purity (Carbon wt %) | 92.9 | 90.3 | 73.0 |
| Yield (g CNT/g Cat) | 13.08 | 9.31 | 2.70 |

Referring to Table 1, carbon nanotubes with high purity were obtained in Examples in which the surface molar ratio was 40% (about 10% to about 30%) or less of the bulk molar ratio and the above-mentioned Equations 1 and 2 were satisfied, and the yield was also increased in Examples.

Experimental Example 2: Evaluation on Resistance of CNT According to Fe Contents Sample A and Sample B were prepared from two different carbon nanotube products commercially available. Carbon nanotubes of Example 1 and Comparative Example 1 as described above were also prepared.

An iron amount and an electrical conductivity were measured with respect to each Example 1, Comparative Example 1, Sample A and Sample B.

The iron (Fe) amount was measured using ICP-OES (Inductively Coupled Plasma Optical Emission Spectrometer, ICP-OES 720). Specifically, carbon nanotube was treated using chloric acid and fluoric acid and heated to vaporize the acid. A remaining inorganic material was heated and dissolved in chloric acid, diluted with ultrapure water, and then the iron amount was analyzed.

The electrical conductivity of carbon nanotube was measured using a manual powder resistivity measuring device. Specifically, a predetermined pressure was applied to 1 g of CNT using Hydraulic Manual Press, and a resistance was measured through 4 Pin Probe Unit. A thickness of pressed CNT was also measured using a thickness gauge. A specific resistance when a density of CNT was 1 was obtained, and the electrical conductivity was calculated from an inverse of the specific resistance.

The results are shown in Table 1 below.

TABLE 2

|  | Example 1 | Comparative Example 1 | Sample A | Sample B |
|---|---|---|---|---|
| Fe amount (ppm) | 0 | 0 | 1150 | 25 |
| Electrical Conductivity (1/Ω · cm) | 6.1E+01 | 4.0E+01 | 4.4E+01 | 5.0E+01 |

Referring to Table 2, the iron amounts were substantially zero in Example 1 and Comparative Example 1 in which the active metal of the catalyst substantially consisted of cobalt and manganese.

However, in Comparative Example 1, the surface molar ratio exceeded 40% of the bulk molar ratio as described in Experimental Example 1. As a result, the purity of CNT was degraded and the electrical conductivity was lower than Example 1.

In the commercial Samples A and B, a large amount of iron was measured, and the electrical conductivity was remarkably lower than that of Example 1.

Fe is one of magnetic metals (e.g., Fe, Ni, Cu, Cr) and may generate 3-dimensional dendrite during a solidification of a battery to reduce a lifespan of the battery. A highly expensive thermal purifying process is needed in order to remove iron, and the electrical conductivity may be degraded due to graphitization during the thermal purifying process.

The carbon nanotube fabricated exemplary embodiments may be substantially devoid of Fe, and an additional purifying process may not be necessary, and thus the carbon nanotube may have enhanced purity and electrical conductivity.

What is claimed is:

1. A catalyst for synthesizing a carbon nanotube, including:
   a support containing a metal, the metal including aluminum; and
   an active metal impregnated on the support, the active metal including cobalt and manganese,
   wherein a surface molar ratio of the active metal relative to the metal of the support is 40% or less of a bulk molar ratio of the active metal relative to the metal of the support, wherein the surface molar ratio is an average molar ratio of the active metal measured within a thickness of 10 nm from an outermost surface of the catalyst, and the bulk molar ratio is an average molar ratio of the active metal throughout the catalyst, and wherein the surface molar ratio of the active metal is in a range from 0.03 to 0.06 relative to aluminum in the support, and the bulk molar ratio of the active metal is in a range from 0.15 to 0.29 relative to aluminum in the support.

2. The catalyst according to claim 1, wherein the surface molar ratio of the active metal is in a range from 10% to 30% of the bulk molar ratio of the active metal.

3. The catalyst according to claim 1, wherein the surface molar ratio is represented by Equation 1 below:

$$\text{aluminum (Al): cobalt (Co): manganese (Mn)} = 1:x1:y1 \quad \text{[Equation 1]}$$

wherein in Equation 1, $0.02 \leq x1 \leq 0.04$, $0.01 \leq y1 \leq 0.02$.

4. The catalyst according to claim 3, wherein, in Equation 1, $0.0200 \leq x1 \leq 0.0375$, $0.0130 \leq y1 \leq 0.0189$.

5. The catalyst according to claim 1, wherein the bulk molar ratio is represented by Equation 2 below:

$$\text{aluminum (Al): cobalt (Co): manganese (Mn)} = 1:x2:y2 \quad \text{[Equation 2]}$$

wherein in Equation 2, $0.08 \leq x2 \leq 0.15$, $0.07 \leq y2 \leq 0.14$.

6. The catalyst according to claim 1, wherein the active metal consists of cobalt and manganese.

7. A method of synthesizing a carbon nanotube, comprising:

preparing a support containing a metal, a cobalt precursor and a manganese precursor;

mixing the support, the cobalt precursor and the manganese precursor with changing molar ratios to form a catalyst knead;

performing a thermal treatment on the catalyst knead to form the catalyst of claim 1 for synthesizing a carbon nanotube; and forming a carbon nanotube using the catalyst.

8. The method according to claim 7, wherein, in the formation of the catalyst knead, the cobalt precursor and the manganese precursor are mixed so that a surface molar ratio of cobalt and manganese relative to the metal in the support is less than a bulk molar ratio of cobalt and manganese relative to the metal in the support.

9. The method according to claim 8, wherein the support includes an aluminum oxide, and the surface molar ratio and the bulk molar ratio of the catalyst are represented by Equation 1 and Equation 2, respectively:

$$\text{aluminum (Al): cobalt (Co): manganese (Mn)} = 1:x1:y1 \quad \text{[Equation 1]}$$

wherein in Equation 1, $0.02 \leq x1 \leq 0.04$, $0.01 \leq y1 \leq 0.02$, $$\text{aluminum (Al): cobalt (Co): manganese (Mn)} = 1:x2:y2 \quad \text{[Equation 2]}$$

wherein in Equation 2, $0.08 \leq x2 \leq 0.15$, $0.07 \leq y2 \leq 0.14$.

10. The method according to claim 7, wherein performing the thermal treatment includes:

drying the catalyst knead at a temperature in a range from 100° C. to 150° C.; and calcinating the dried catalyst knead at a temperature in a ranging from 400° C. to 600° C.

11. The method according to claim 7, wherein forming the carbon nanotube includes a chemical vapor deposition or a chemical vapor synthesis.

12. The method according to claim 7, wherein the cobalt precursor includes cobalt nitrate or a hydrate thereof, and the manganese precursor includes manganese nitrate or a hydrate thereof.

* * * * *